(12) United States Patent
Angelo et al.

(10) Patent No.: US 10,454,902 B2
(45) Date of Patent: *Oct. 22, 2019

(54) TECHNIQUES FOR SECURE DATA EXTRACTION IN A VIRTUAL OR CLOUD ENVIRONMENT

(71) Applicant: NetIQ Corporation, Provo, UT (US)

(72) Inventors: Michael F. Angelo, Spring, TX (US); Lloyd Leon Burch, Payson, UT (US)

(73) Assignee: NetIQ Corporation, Provo, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/368,904

(22) Filed: Dec. 5, 2016

(65) Prior Publication Data
US 2017/0180331 A1    Jun. 22, 2017

Related U.S. Application Data

(63) Continuation of application No. 13/906,761, filed on May 31, 2013, now Pat. No. 9,514,313.

(60) Provisional application No. 61/788,671, filed on Mar. 15, 2013.

(51) Int. Cl.
| H04L 29/06 | (2006.01) |
| G06F 21/60 | (2013.01) |
| G06F 21/57 | (2013.01) |
| G06F 9/455 | (2018.01) |
| H04L 9/08 | (2006.01) |
| H04L 9/32 | (2006.01) |

(52) U.S. Cl.
CPC ...... *H04L 63/0428* (2013.01); *G06F 9/45558* (2013.01); *G06F 21/57* (2013.01); *G06F 21/602* (2013.01); *H04L 9/08* (2013.01); *H04L 9/3234* (2013.01); *H04L 63/04* (2013.01); *H04L 63/062* (2013.01); *G06F 2009/45595* (2013.01); *G06F 2221/2107* (2013.01)

(58) Field of Classification Search
None
See application file for complete search history.

(56) References Cited

U.S. PATENT DOCUMENTS

| 7,987,497 | B1 | 7/2011 | Giles et al. | |
| 8,225,314 | B2* | 7/2012 | Martins | G06F 8/63 718/1 |
| 8,364,983 | B2 | 1/2013 | Rangegowda et al. | |
| 9,361,089 | B2* | 6/2016 | Bradfield | G06F 21/53 |
| 9,514,313 | B2* | 12/2016 | Angelo | G06F 21/602 |
| 2009/0172781 | A1* | 7/2009 | Masuoka | H04L 63/105 726/3 |
| 2009/0282266 | A1* | 11/2009 | Fries | G06F 21/602 713/193 |

(Continued)

OTHER PUBLICATIONS

U.S. Appl. No. 13/906,761, U.S. Pat. No. 9,514,313, filed May 31, 2013, Techniques for Secure Data Extraction in a Virtual or Cloud Environment.

(Continued)

*Primary Examiner* — Kaveh Abrishamkar
(74) *Attorney, Agent, or Firm* — Schwegman Lundberg & Woessner, P.A.

(57) ABSTRACT

Techniques for secure data extraction in a virtual or cloud environment are presented. Desired data from a Virtual Machine (VM) or an entire VM is extracted and encrypted with a key. This key is sealed to a machine or a group of machines. The encrypted data is then migrated and successfully used on startup for instances of the VM by having the ability to access the sealed key (and unsealing it) to decrypt the encrypted data.

20 Claims, 3 Drawing Sheets

(56) References Cited

U.S. PATENT DOCUMENTS

| | | | |
|---|---|---|---|
| 2011/0302415 A1* | 12/2011 | Ahmad | G06F 21/57 713/168 |
| 2012/0084445 A1* | 4/2012 | Brock | G06F 9/5077 709/226 |
| 2012/0216052 A1* | 8/2012 | Dunn | G06F 21/78 713/193 |
| 2013/0086383 A1* | 4/2013 | Galvao de Andrade | H04L 9/0897 713/171 |
| 2013/0097296 A1* | 4/2013 | Gehrmann | G06F 9/4856 709/223 |
| 2014/0130040 A1* | 5/2014 | Lemanski | G06F 9/4856 718/1 |
| 2014/0201533 A1 | 7/2014 | Kruglick | |
| 2014/0281509 A1 | 9/2014 | Angelo et al. | |

OTHER PUBLICATIONS

U.S. Appl. No. 13/906,761, Non Final Office Action dated Nov. 28, 2014, 22 pgs.

U.S. Appl. No. 13/906,761, Response filed Mar. 2, 2015 to Non Final Office Action dated Nov. 28, 2014, 9 pgs.

U.S. Appl. No. 13/906,761, Final Office Action dated Apr. 1, 2015, 20 pgs.

U.S. Appl. No. 13/906,761, Response filed Jun. 8, 2015 to Final Office Action dated Apr. 1, 2015, 9 pgs.

U.S. Appl. No. 13/906,761, Advisory Action dated Jun. 19, 2015, 3 pgs.

U.S. Appl. No. 13/906,761, Non Final Office Action dated Jul. 21, 2015, 19 pgs.

U.S. Appl. No. 13/906,761, Response filed Oct. 21, 2015 to Non Final Office Action dated Jul. 21, 2015, 9 pgs.

U.S. Appl. No. 13/906,761, Final Office Action dated Nov. 5, 2015, 20 pgs.

U.S. Appl. No. 13/906,761, Response filed Feb. 5, 2016 to Final Office Action dated Nov. 5, 2015, 9 pgs.

U.S. Appl. No. 13/906,761, Non Final Office Action dated Apr. 15, 2016, 21 pgs.

U.S. Appl. No. 13/906,761, Response filed Jul. 13, 2016 to Non Final Office Action dated Apr. 15, 2016, 8 pgs.

U.S. Appl. No. 13/906,761, Notice of Allowance dated Aug. 9, 2016, 5 pgs.

* cited by examiner

TECHNIQUES FOR SECURE DATA EXTRACTION IN A VIRTUAL OR CLOUD ENVIRONMENT

RELATED APPLICATIONS

This application is a continuation of U.S. patent application Ser. No. 13/906,761, filed on May 31, 2013, now issued as U.S. Pat. No. 9,514,313, which is a non-provisional filing of, claims priority under 35 U.S.C. 119(e) to, U.S. Provisional Patent Application Ser. No. 61/788,671, filed on March 15, 2013, entitled: "Method and Apparatus for Sensitive Data Extraction and Protection in a Virtual Environment (a.k.a. Virtual Machine or Cloud)," each of which is incorporated by reference herein.

BACKGROUND

Increasingly industries and individuals are moving their storage and processing to virtual or cloud environments. This has a variety of advantages, such as: high availability of resources, since access is not tied to any specific device; failover access when a device fails; outsourced management of the resources; and others.

However, this trend is not without its issues, particularly when it comes to security. Nearly every day, the news reports on customer data from a particular enterprise being compromised by hackers. Much of the security issues stems from the use of Virtual Machines (VM) that can be independent of hardware to which they run and that can be extremely portable.

A traditional computing environment includes a variety of security controls, which are noticeably absent from virtual/cloud environments, such as access controls identified as file permissions to protect sensitive data. Hardware specific encryption is even used to sometimes encrypt all data on a particular storage device.

Consider that passwords and other encrypted information are often retained for some period of time in a decrypted format within memory of a VM; to facilitate fast access and seamless motion, the VM will often store memory on disk or a networked device (this stored memory includes decrypted passwords and other secrets). Because the decrypted information resides in files or as a data stream (over the network wires), that information can be modified and/or accessed by external entities. These same entities can also copy the operating VM, or copy the VM as it is migrated across the network. So, even if a situation were detected and the VM was abruptly shut down, this remedy still might not work to protect all the sensitive data because some remnants of the data may still reside in memory in an unprotected or decrypted format.

SUMMARY

Various embodiments of the invention provide techniques for secure data extraction in a virtual or cloud environment. In an embodiment, a method for extracting and securing data from a virtual environment is presented.

Specifically, an encryption key that is tailored for a virtual processing environment is acquired. Next, selective data to extract from the virtual processing environment is identified. Finally, the selective data is encrypted with the encryption key.

DETAILED DESCRIPTION

A "resource" includes a user, service, system, device, directory, data store, groups of users, a Virtual Machine (VM), a cloud, combinations and/or collections of these things, etc. A "principal" is a specific type of resource, such as an automated service or user that at one time or another is an actor on another principal or another type of resource. A designation as to what is a resource and what is a principal can change depending upon the context of any given network transaction. Thus, if one resource attempts to access another resource, the actor of the transaction may be viewed as a principal. Resources can acquire and be associated with unique identities to identify unique resources during network transactions.

An "identity" is something that is formulated from one or more identifiers and secrets that provide a statement of roles and/or permissions that the identity has in relation to resources. An "identifier" is information, which may be private and permits an identity to be formed, and some portions of an identifier may be public information, such as a user identifier, name, etc. Some examples of identifiers include social security number (SSN), user identifier and password pair, account number, retina scan, fingerprint, face scan, etc.

A "processing environment" defines a set of cooperating computing resources, such as machines (processor and memory-enabled devices), storage, software libraries, software systems, etc. that form a logical computing infrastructure. A "logical computing infrastructure" means that computing resources can be geographically distributed across a network, such as the Internet. So, one computing resource at network site X and be logically combined with another computing resource at network site Y to form a logical processing environment.

The phrases "processing environment," "cloud processing environment," "virtual environment," "virtual machine (VM)," and the term "cloud" may be used interchangeably and synonymously herein.

Various embodiments of this invention can be implemented in existing network architectures.

Also, the techniques presented herein are implemented in machines, such as processor or processor-enabled devices (hardware processors). These machines are configured and the memories programmed to specifically perform the processing of the methods and systems presented herein. Moreover, the methods and systems are implemented and reside within memory and/or a non-transitory computer-readable storage media or machine-readable storage medium and are processed on the machines configured to perform the methods.

Of course, the embodiments of the invention can be implemented in a variety of architectural platforms, devices, operating and server systems, and/or applications. Any particular architectural layout or implementation presented herein is provided for purposes of illustration and comprehension only and is not intended to limit aspects of the invention.

Figure 1:
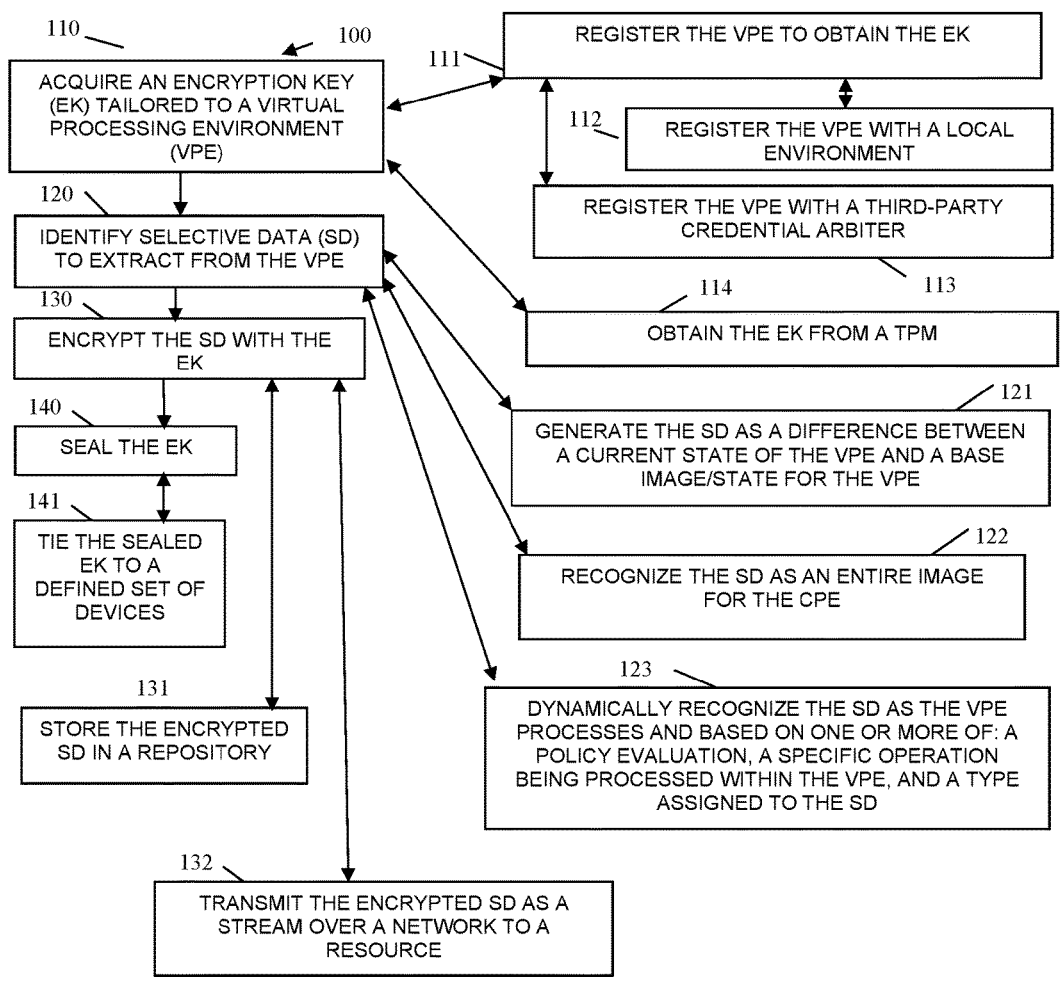
FIG. 1 is a diagram of a method for extracting and securing data from a virtual environment, according to an example embodiment presented herein.
Figure 2:
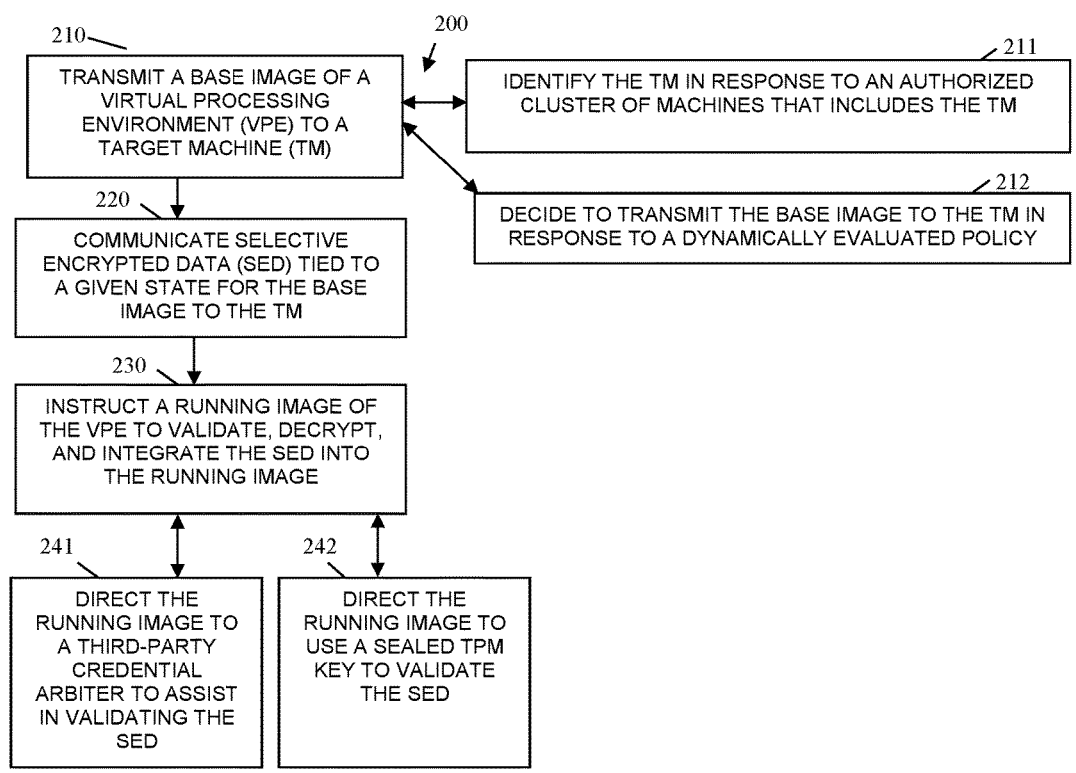
FIG. 2 is a diagram of another method for extracting and securing data from a virtual environment, according to an example embodiment.
Figure 3:
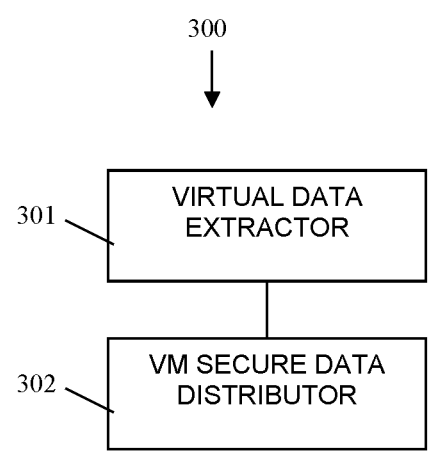
FIG. 3 is a diagram of a secure virtual data extraction system, according to an embodiment.

It is within this context that embodiments of the invention are now discussed within the context of the FIGS. 1-3.

FIG. 1 is a diagram of a method 100 for extracting and securing data from a virtual environment, according to an example embodiment presented herein. The method 100 (herein after referred to as "virtual data extractor") is implemented, programmed, and resides within memory and/or a non-transitory machine-readable storage medium that executes on one or more processors of a device and is operational over a network. The network may be wired, wireless, or a combination of wired and wireless.

In an environment, the virtual data extractor is implemented as part of the Input/Output (I/O) control mechanisms for a virtual environment (VM or cloud). The I/O control mechanisms are available to initially startup and instantiate the virtual environment as well. In some cases, parts of the virtual data extractor may also be associated with a distributor mechanism for the virtual environment.

Some initial example situations that illustrate the features of the virtual data extractor are now presented for purposes of illustration and comprehension before discussion of the processing reflected in the FIG. 1.

As will be more completely described herein and below, the embodiments presented allows for the extraction of information from a virtual environment and subsequent custom encryption. Extraction can be achieved in a variety of ways, such as but not limited to, a binary difference calculation from a known state of the virtual environment. Consider the following scenario:

On Setup
   Register VM host machine with a local user environment (get a Trusted-Platform Module (TPM) key from VM Host Machine);
   Set up VMbase (VM initial image);
   Save VMbase;
   Execute programs during operation of the VMbase;
   Save a delta state (current VM-running state—VMbase) to a separate file;
   Encrypt the delta state; and
   Seal the key to a particular group of machines (using a TPM key) (cluster definition). This can include using a particular state of the machine(s) as well as a TPM device key.

On Startup
   Send the VMbase to a VM host machine;
   Send the delta state to VM host machine;
   Cloud software attempts to decrypt the delta state information with the key (the key is from the TPM that was sealed);
   The un-encrypted delta state is injected into the VMbase to create a VM-running instance; and
   VM-running is instantiated.

On Migration:
   Save the delta state (a current VM-running state—minus the VMbase) to a separate file;
   Encrypt the delta state with the associated TPM key;
   Send the VMbase to a VM new host machine;
   Send the delta state to the VM new host machine (is part of the TPM 'cluster' of machines permitted to access the VM); and
   Follow "On Startup" procedures thereafter.

It is noted that by using the TPM, this protects against third party compromise, i.e. someone that doesn't own the systems, and has access to the VM base and the delta state. It is also worthy to note that the key stored in the TPM is marked as not permitted to be migrated (non transferrable). Consider the following validation procedure for the example presented above:

On Validation:
   VM host new—attempts to decrypt the delta state;
   Failure is detected:
      means that the VM host new is not part of a VM TPM group; and/or
      means that that VM the delta was modified in transmission;
   Success is detected:
      means that the VM host new is authorized for access; and
      means that the VM delta was not modified in transmission.

An example of how this may be used is as follows:
Setup:
   Company A wants to use a cloud to perform customer trend analysis. In order to do this, A uploads the corporate analysis environment and its customer data to a web site. While the general environment is pretty much public information, the corporate analysis environment may be classified as being sensitive; the customer data is classified as restricted. In this scenario, Company A creates a local VM with the public information. Company A snaps an image of the initial VM (VMbase). Then, Company A finishes building up the system and generates a delta state in a separate file. The delta image is then be encrypted. When the encryption is complete, the key is also sealed (encrypted) and sent to a remote site where it is protected by a particular TPM.

On Startup:
   Company A sends its VMbase to a VM host machine 1. Company A sends its VM delta to the VM host machine 1. The VM host machine 1 decrypts the delta and inserts the delta information into the VMbase. The VM host machine 1 then loads and executes the complete VM.

On Migration:
   The VM host machine 1 suspends the current running instance of the VM. The then-existing delta state is extracted and sealed to the TPM again (again VM-running state—VMbase is the then-existing delta state). The delta state is then sent to a new target machine (VM target). The VM target then decrypts the delta with the key that was sealed in the TPM.

On Validation:
   VM target can also use this process to validate the origin and integrity of the delta by its ability to decrypt the data. If the delta was not able to be decrypted it means either that there was no relationship to VM target or the delta was modified in transmission (as discussed above).

In another embodiment, there is no delta created for a VMbase at all. Such a scenario saves on the time to re-constitute any given VM but may require additional time to decrypt the entire base.

In yet another instance of the virtual data extractor, a TPM is not used; rather, a callback mechanism to get credentials for validation is integrated into the environment so as to make the system active. Such a process can proceed as follows:

On Set Up
   Register a third party arbitrator with a VM host (and generate a bound token on registration);
   Setup a VMbase;
   Save the VMbase;
   Execute programs during normal operation of the VM associated with the VMbase;
   Save the then-existing VM; and
   Encrypt the then-existing VM with the bound token for the third party.

On Startup
 Send the VM to a VM host machine;
 The VM host machine queries the third party arbitrator;
 The third party arbitrator authenticates the VM host machine;
 If the VM host machine is successfully authenticated, then the third party arbitrator sends the key forward to the VM host machine;
 The VM host machine decrypts the VM; and
 The VM host machine runs the VM.
On Migration:
 Hibernate a VM;
 Encrypt the VM with the third party arbitrator key;
 Migrate the VM to a new target VM; and
 The target VM follows the "On Startup" process.
 It is noted that in some cases, the embodiments discussed above may also be accomplished using Public/Private key encryption.

Moreover, it is noted that in some cases with the validation process, if a TPM key that was established is sealed to the configuration of a particular machine, this precludes the machine in an untrusted configuration from accessing the delta (difference between a then-existing VM state and its VMbase).

The processing of the FIG. 1 is now discussed with respect to the virtual data extractor.

At 110, the virtual data extractor acquires an encryption key tailored or customized for a virtual processing environment (VM or cloud). Acquisition can occur in a variety of manners.

For example, at 111, the virtual data extractor registers the virtual processing environment to obtain the encryption key.

Continuing with the embodiment of 111 and in another embodiment at 112, the virtual data extractor registers the virtual processing environment with a local environment of the device that executes the virtual processing environment (VM host machine).

In another instance of 111 and at 113, the virtual data extractor registers the virtual processing environment with a third-party credential arbiter, such as an identity manager or authentication service. So, entities (services and devices) authenticate and are in trusted communications with the third-party credential arbiter, who provides validation and authenticate services can who delivers credentials to the entities on request, such as a custom encryption key.

According to an embodiment, at 114, the virtual data extractor obtains the encryption key from a TPM of the device that hosts the virtual processing environment.

At 120, the virtual data extractor identifies the selective data to extract from the virtual processing environment. Again, the mechanisms used to identify the selective data can vary without departing from the teachings presented herein.

For example, at 121, the virtual data extractor generates the selective data as a difference between a current running state of the virtual processing environment and a base image/state for the virtual processing environment (this situation was discussed in detail above as the examples that included VMbase and VM running).

In another case, at 122, the virtual data extractor recognizes the selective data an entire image for the virtual processing environment. So, the selective data can in some instances be an entire imaged captured for the virtual processing environment (VM or cloud) at any given point in time (this situation was also discussed above).

In some situations, at 123, the virtual data extractor dynamically recognizes the selective data as the virtual processing environment processes and these situations can be based on one or more of: a policy evaluation, a specific operation being processed within the virtual processing environment, ad a type assigned to the selective data.

At 130, the virtual data extractor encrypts the selective data with the encryption key. This encryption occurs whenever the selective data is housed on disk, streamed over a network, and the like.

For example, at 131, the virtual data extractor stores the encrypted selective data in a repository (on disk).

In another case, at 132, the virtual data extractor transmits the encrypted selective data as a stream over a network to a resource.

According to an embodiment, at 140, the virtual data extractor seals the encryption key. Here, the encryption key itself is encrypted with a one or a variety of other keys/secrets.

In one instance, at 141, the virtual data extractor ties the sealed encryption key to a defined set of devices. So, a cluster of set of machines/devices can be identified as authorized to process instances of the virtual processing environment where each machine/device includes its own key or secret (in some instances this can be a public key for each machine/device) and each key or secret is used as a collection to generate a key used to encrypt (seal) the original encryption key.

FIG. 2 is a diagram of another method 200 for extracting and securing data from a virtual environment, according to an example embodiment. The method 200 (herein after referred to as "VM secure data distributor") is implemented, programmed, and resides within memory and/or a non-transitory machine-readable storage medium that executes on one or more processors of a machine and is operational over a network. The network may be wired, wireless, or a combination of wired and wireless.

The VM secure data distributor is presented from the perspective of a VM migration and/or instantiation mechanism for the virtual data extractor (discussed above with reference to the FIG. 1). That is, the virtual data extractor focuses on securely extracting and packaging either an entire VM or selected data associated with a VM (such as but not limited to a VM delta (as discussed above with the FIG. 1)) whereas the VM secure data distributor focuses on distributing and/or validating the extracted and packaged VM or selected extracted VM-sensitive data.

At 210, the VM secure data distributor transmits a base image of a virtual processing environment to a target machine (such as a VM target machine or environment).

In an environment, at 211, the VM secure data distributor identifies the target machine in response to an authorized cluster of machines that includes the target machine.

In another case, at 212, the VM secure data distributor decides to transmit the base image to the target machine in response to a dynamically evaluated policy.

At 220, the VM secure data distributor communicates selective encrypted data tied to a given state for the base image to the target machine.

At 230, the VM secure data distributor instructs a running image of the virtual processing environment to validate, decrypt, and integrate the selective encrypted data into the running image.

According to an embodiment, at 231, the VM secure data distributor directs the running image to a third-party credential arbiter to assist in validating the selective encrypted data.

In another case, at 232, the VM secure data distributor directs the running image to use a sealed TPM key to validate the selective encrypted data.

FIG. 3 is a diagram of a secure virtual data extraction system 300, according to an embodiment. The components of the secure virtual data extraction system 300 are implemented as executable instructions that reside within memory and/or non-transitory computer-readable storage media and those instructions are executed by one or more devices. The components and the devices are operational over a network and the network can be wired, wireless, or a combination of wired and wireless.

According to an embodiment, the secure virtual data extraction system 300 implements, inter alia, the features of the FIGS. 1-2.

The secure virtual data extraction system 300 includes a virtual data extractor 301 and a VM secure data distributor. Each of these will be discussed in turn.

The secure virtual data extraction system 300 includes a machine having memory configured with the virtual data extractor 301. Example processing associated with the virtual data extractor 301 was presented above in detail with reference to the FIG. 1. The virtual data extractor 301 interacts with instances of the VM secure data distributor 302 (described above with reference to the FIGS. 1-2).

The virtual data extractor 301 is configured to selectively identify, extract, and encrypt data associated with a VM. The manner in which the data can be identified was presented above with respect to the FIG. 1. Moreover, the types of encryption can be customized and based on a TPM key or other custom encryption keys.

According to an embodiment, the virtual data extractor 301 is integrated into a base image associated with the VM.

The secure virtual data extraction system 300 includes a same machine (as what was used with the virtual data extractor 301) or a different machine having memory configured with the VM secure data distributor 302. Example processing associated with the VM secure data distributor 302 was presented above in detail with reference to the FIGS. 1-2 and more particularly with the FIG. 2.

The VM secure data distributor 302 is configured to deliver the encrypted data to a target machine that is to run an instance of the VM and instruct the target machine to validate, decrypt, and integrate the encrypted data within the instance. Some example mechanisms to validate and decrypted the instance was presented above with respect to the FIG. 1.

In an embodiment, the encrypted data is encrypted with a key that is tied to a configuration of the target machine. So, the encryption can be tied to a TPM based solution or tied to a specific machine configuration.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The invention claimed is:

1. A method, comprising:
securely maintaining an encrypted delta between a running instance of a virtual environment on a first machine and a base image for the virtual environment;
transferring the base image to a second machine;
separately providing the encrypted delta to the second machine;
decrypting the encrypted delta into a delta using at least one second machine key located on the second machine; and
inserting the delta into the base image on the second machine by the second machine before initiation of the base image at the second machine, and thereafter initiating, by the second machine, the base image with the integrated delta already inserted into the base image as a second running instance of the virtual environment on the second machine.

2. The method of claim 1, wherein securely maintaining further includes sealing a second key for accessing the delta based on identifiers for the first machine and the second machine.

3. The method of claim 1, wherein securely maintaining further includes maintaining the encrypted delta and the base image on a third machine.

4. The method of claim 1, wherein securely maintaining further includes obtaining the encrypted delta as a confidential file accessible from the running instance.

5. The method of claim 1, wherein securely maintaining further includes obtaining the encrypted delta as a change in a state while the running instance processes on the first machine.

6. The method of claim 1, wherein securely maintaining further includes obtaining the encrypted delta as selective data custom defined for the base image.

7. The method of claim 1, wherein separately providing further includes providing the encrypted delta in response to a request made from the second machine for the encrypted delta after the second machine receives the base image.

8. The method of claim 1, wherein providing further includes providing the encrypted delta to the second machine in an encrypted format that is specific to the second machine and that can only be decrypted for use by the second machine through the at least one second machine key located on the second machine.

9. A method, comprising:
establishing secure keys between a group of machines;
identifying delta data in a base image of a virtual environment, wherein the delta data is maintained separately from the base image in an encrypted format using the secure keys;
transferring the base image to a first machine of the group of machines;
providing the delta data in the encrypted format to the first machine; and
initiating, by the first machine, a first running instance of the virtual environment by decrypting the delta data in the encrypted format with one of the keys located on the first machine as decrypted delta data, integrating and inserting the decrypted delta data into the base image, and thereafter initiating, by the first machine, the first running instance having the decrypted delta data already integrated into the base image on the first machine.

10. The method of claim 9 further comprising:
receiving changes made to the delta data in the encrypted format from the first running instance during processing of the first running instance on the first machine.

11. The method of claim 10 further comprising:
transferring the base image to a second machine of the group of machines;
providing the changed delta data in the encrypted format to the second machine; and
initiating, by the second machine, a second running instance of the virtual environment by decrypting the changed delta data in the encrypted format with another one of the keys available from the second machine, integrating the decrypted changed delta into the base image, and initiating the second running instance.

12. The method of claim 9 further comprising:

receiving changes made to the delta data in the encrypted format from a second machine of the group of machines.

13. The method of claim 12 further comprising:

providing the changed delta data in the encrypted format to the first machine; and decrypting, by the first machine, the changed delta data in the encrypted format using the one key available from the first machine; and updating, by the first machine, the first running instance of the virtual environment with the decrypted changed delta data.

14. The method of claim 9, wherein identifying further includes maintaining the delta data as executable instructions.

15. The method of claim 9, wherein identifying further includes maintaining the delta data as file data.

16. The method of claim 9, wherein identifying further includes maintaining the delta data based on evaluation of a policy that selectively defines the delta data within the base image.

17. The method of claim 9, wherein identifying further includes maintaining the delta data as state changes made to selective data included within the base image during processing of the first running instance on the first machine.

18. A system, comprising:
first machine;
a processor;
a non-transitory computer-readable storage medium having executable instructions;
the executable instructions when executed by the processor from the non-transitory computer-readable storage medium configured to perform processing to:
extract selective data from a base image of a virtual environment;
maintain the selective data separately from the base image in an encrypted format for which access requires keys and each key specific to a particular machine defined in a group of machines; and
provide the base image separate from the selective data to machines in the group of machines;
wherein each machine in the group of machines: decrypts the selective data using that machine's specific key from the keys located on that machine as decrypted selective data, integrates and inserts the decrypted selective data into the base image, and thereafter, each machine initiates a running instance of the virtual environment from the base image having that machine's decrypted selective data already the integrated into the base image on that machine.

19. The system of claim 18, wherein the selective data is defined by a policy.

20. The system of claim 18, wherein the selective data is one of: executable code and one or more data files.

* * * * *